(12) United States Patent
Fukuda et al.

(10) Patent No.: US 11,429,701 B2
(45) Date of Patent: Aug. 30, 2022

(54) DETERMINING BIOMETRIC AUTHENTICATION BIT STRING RELIABILITY

(71) Applicant: FUJITSU LIMITED, Kawasaki (JP)

(72) Inventors: Mitsuaki Fukuda, Sagamihara (JP); Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 317 days.

(21) Appl. No.: 16/553,491

(22) Filed: Aug. 28, 2019

(65) Prior Publication Data
US 2019/0384904 A1 Dec. 19, 2019

Related U.S. Application Data

(63) Continuation of application No. PCT/JP2018/006032, filed on Feb. 20, 2018.

(30) Foreign Application Priority Data
Mar. 9, 2017 (JP) .............................. JP2017-044912

(51) Int. Cl.
*G06F 21/32* (2013.01)
*G06F 7/58* (2006.01)
(Continued)

(52) U.S. Cl.
CPC .............. *G06F 21/32* (2013.01); *G06F 7/582* (2013.01); *G06V 20/30* (2022.01); *G06V 20/46* (2022.01); *G07C 9/25* (2020.01)

(58) Field of Classification Search
CPC ........... G06F 21/32; G06F 7/582; G07C 9/25; G06K 9/00677; G06K 9/00744; G06K 9/00067; G06T 7/00
See application file for complete search history.

(56) References Cited

U.S. PATENT DOCUMENTS

| 5,291,560 A * | 3/1994 | Daugman | .......... G06K 9/00906 |
| | | | 382/117 |
| 2007/0053580 A1* | 3/2007 | Ishikawa | .......... G06T 7/001 |
| | | | 382/149 |

(Continued)

FOREIGN PATENT DOCUMENTS

| JP | 2008-152608 | 7/2008 |
| JP | 2014-074964 | 4/2014 |

(Continued)

OTHER PUBLICATIONS

EPOA—Office Action of European Patent Application No. 18764163.4 dated Dec. 4, 2020.

(Continued)

*Primary Examiner* — Robert B Leung
*Assistant Examiner* — Bruce S Ashley
(74) *Attorney, Agent, or Firm* — Fujitsu Patent Center

(57) ABSTRACT

An information processing apparatus includes: a memory; and a processor coupled to the memory and configured to: extract a plurality of feature points from a biometric image; calculate, for each of the feature points, respective feature vectors including the respective feature points from the biometric image; calculate bit strings by binarizing a value of each of dimensions for each of the calculated feature vectors; attach reliability to each of the calculated bit strings based on stability of the binarizing of the corresponding feature vector; and select a specific number of the bit strings from the calculated bit strings in accordance with values of the reliability.

3 Claims, 11 Drawing Sheets

(51) Int. Cl.
    *G07C 9/25*     (2020.01)
    *G06V 20/30*     (2022.01)
    *G06V 20/40*     (2022.01)

(56) References Cited

U.S. PATENT DOCUMENTS

| | | | | |
|---|---|---|---|---|
| 2010/0272325 | A1* | 10/2010 | Veldhuis | G06K 9/46 382/115 |
| 2012/0028710 | A1* | 2/2012 | Furukawa | G06F 21/32 463/37 |
| 2015/0036894 | A1 | 2/2015 | Matsunami | |

FOREIGN PATENT DOCUMENTS

| | | |
|---|---|---|
| JP | 2015-028723 | 2/2015 |
| JP | 2015-036906 | 2/2015 |
| JP | 2015-230715 | 12/2015 |

OTHER PUBLICATIONS

International Search Report mailed in connection with PCT/JP2018/006032 and dated May 15, 2018 (1 page).

EESR—The Extended European Search Report of European Patent Application No. 18764163.4 dated Feb. 13, 2020.

M. Meiru et al., "Binary Gabor Statistical Features for Palmprint Template Protection", International Conference on Financial Cryptography and Data Security; [Lecture Notes in Computer Science; Lect.Notes Computer], Springer, Berlin, Heidelberg, XP047470227, ISBN 978-3-642-17318-9, pp. 593-601, Nov. 7, 2012.

X. Zhou et al., "Privacy Enhancing Technology for a 3D-Face Recognition System", Internet Citation, XP007909730, Retrieved from the Internet:URL:http://www.3dface.org/files/papers/zhou-CAST2007-TemplateProtection.pdf, 12 pages, Jan. 1, 2007 cited in EESR dated Feb. 13, 2020 for corresponding European Patent Application No. 18764163.4.

\* cited by examiner

VALUE OF EACH DIMENSION OF FEATURE VECTOR

BTH

VALUE OF EACH DIMENSION OF FEATURE VECTOR

BTH

RTH

VALUE OF EACH DIMENSION OF FEATURE VECTOR

BTH

MVA

DETERMINING BIOMETRIC AUTHENTICATION BIT STRING RELIABILITY

CROSS-REFERENCE TO RELATED APPLICATION

This application is a continuation application of International Application PCT/JP2018/006032 filed on Feb. 20, 2018 and designated the U.S., the entire contents of which are incorporated herein by reference. The International Application PCT/JP2018/006032 is based upon and claims the benefit of priority of the prior Japanese Patent Application No. 2017-044912, filed on Mar. 9, 2017, the entire contents of which are incorporated herein by reference.

FIELD

The embodiments relate to an information processing apparatus, a biometric authentication method, and a biometric authentication program.

BACKGROUND

Biometric authentication technology for performing authentication using some features of a human body, such as a vein pattern, a fingerprint, and a face image, are becoming widespread.

Related art is disclosed in Japanese Laid-open Patent Publication No. 2008-152608, Japanese Laid-open Patent Publication No. 2015-36906 and Japanese Laid-open Patent Publication No. 2014-74964.

SUMMARY

According to an aspect of the embodiments, an information processing apparatus includes: a memory; and a processor coupled to the memory and configured to: extract a plurality of feature points from a biometric image; calculate, for each of the feature points, respective feature vectors including the respective feature points from the biometric image; calculate bit strings by binarizing a value of each of dimensions for each of the calculated feature vectors; attach reliability to each of the calculated bit strings based on stability of the binarizing of the corresponding feature vector; and select a specific number of the bit strings from the calculated bit strings in accordance with values of the reliability.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In order to speed up collation processing in biometric authentication, for example, a method for expressing biometric data for authentication by binary bit strings of "0" and "1", and calculating similarity by simple comparison of the bit strings is provided.

Figure 10:
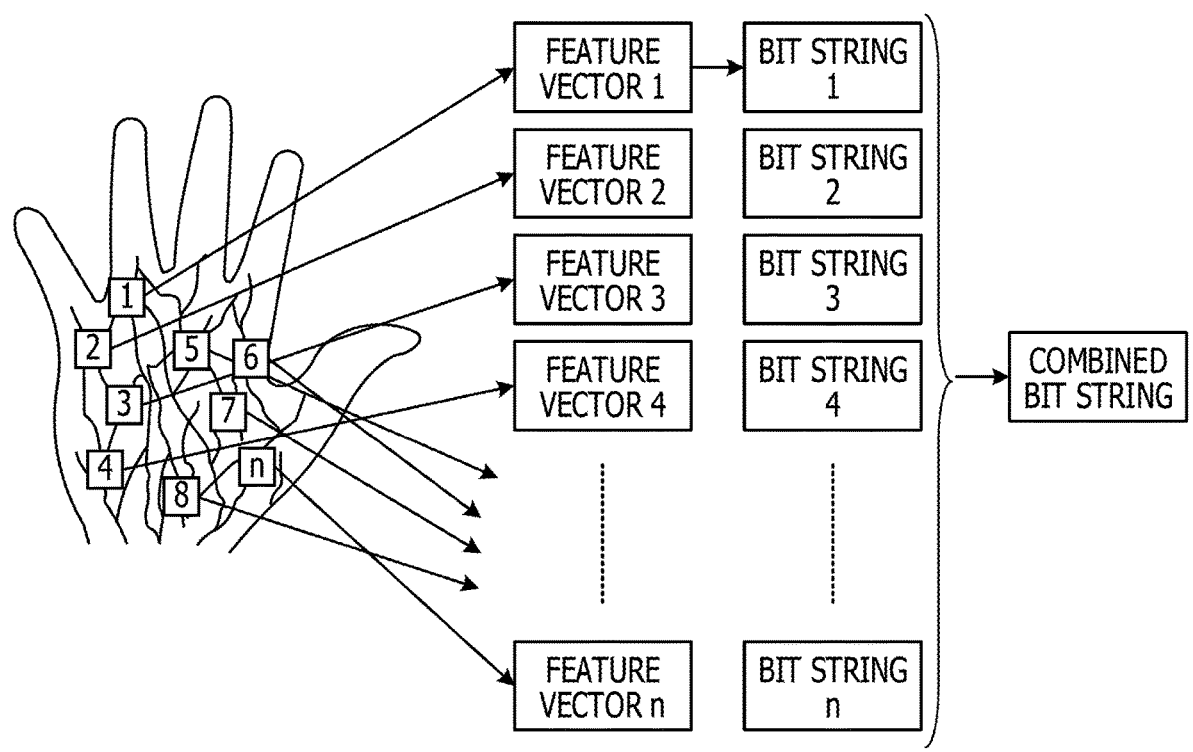
FIG. 10 is a diagram for describing generation of a bit string for collation.

As a method for generating a bit string, there is a method for extracting a plurality of feature points serving as references for collation from a captured biometric image, calculating a multidimensional feature vector for each feature point, and binarizing values of dimensions of the feature vector. For example, as illustrated in FIG. 10, bit strings are acquired by extracting a plurality of feature points (n feature points in the illustrated example) from a captured biometric image, calculating a multidimensional feature vector for each feature point, and binarizing values of dimensions of the feature vector. Then, the bit strings for the feature points are combined, and a combined bit string is used as biometric data used for collation.

Figure 11:
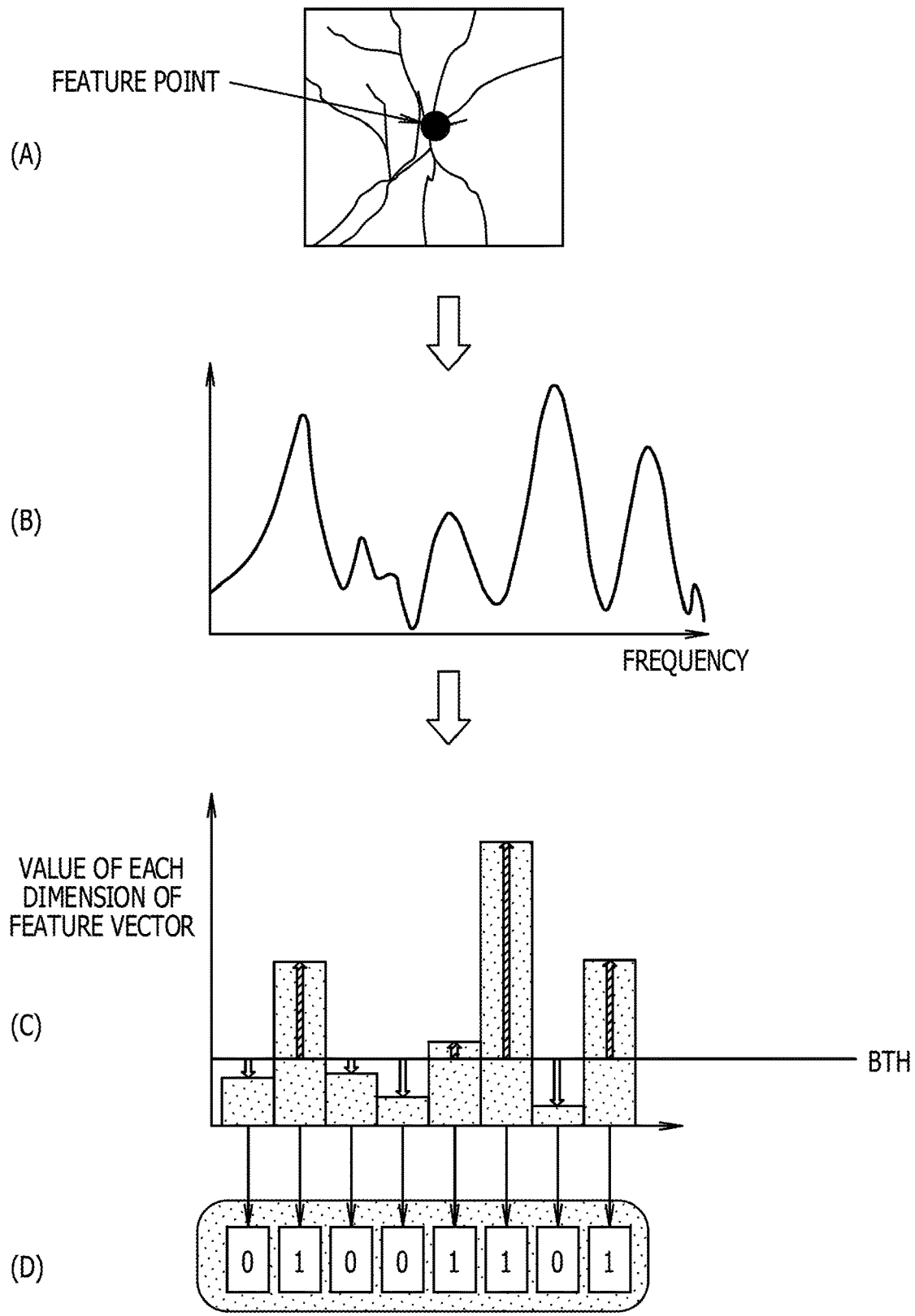
FIG. 11 is a diagram for describing generation of a bit string at a feature point.

In generation of a bit string for each feature point, for example, a partial image in the vicinity of a feature point including a feature point as illustrated in FIG. 11(A) is cut out from a biometric image, and a frequency component is extracted by performing a polar coordinate conversion or the like on the partial image (FIG. 11(B)). A bit string as illustrated in FIG. 11(D) is obtained by selecting m values from the frequency component to calculate an m-dimensional feature vector (FIG. 11(C)), comparing values of dimensions of the feature vector with a threshold BTH, and binarizing the values of the feature vector to set each of the values to "1" when the value is greater than the threshold BTH or "0" when the value is smaller than the threshold BTH.

Since a data size of a combined bit string used for collation is (the number of dimensions of a feature vector)× (the number of feature points), there are cases where, even when a large number of feature points can be extracted from a biometric image, it is not always possible to combine all bit strings corresponding to the feature points and hold the combined big string as registration data due to a limitation on a storage capacity. As a method for solving this, it is conceivable to randomly delete a bit string exceeding the size, or to use bit strings registered before reaching the size as registration data. However, deterioration in authentication accuracy is concerned. For example, for a feature point converted into a feature vector having a value binarized value of which is difficult to determine, a different bit string is generated for each collation, and an authentication result becomes unstable. In one aspect, a biometric authentication apparatus capable of reducing an amount of registration data while suppressing deterioration in authentication accuracy may be provided.

Hereinafter, embodiments of the present invention will be described based on the drawings.

Figure 1:
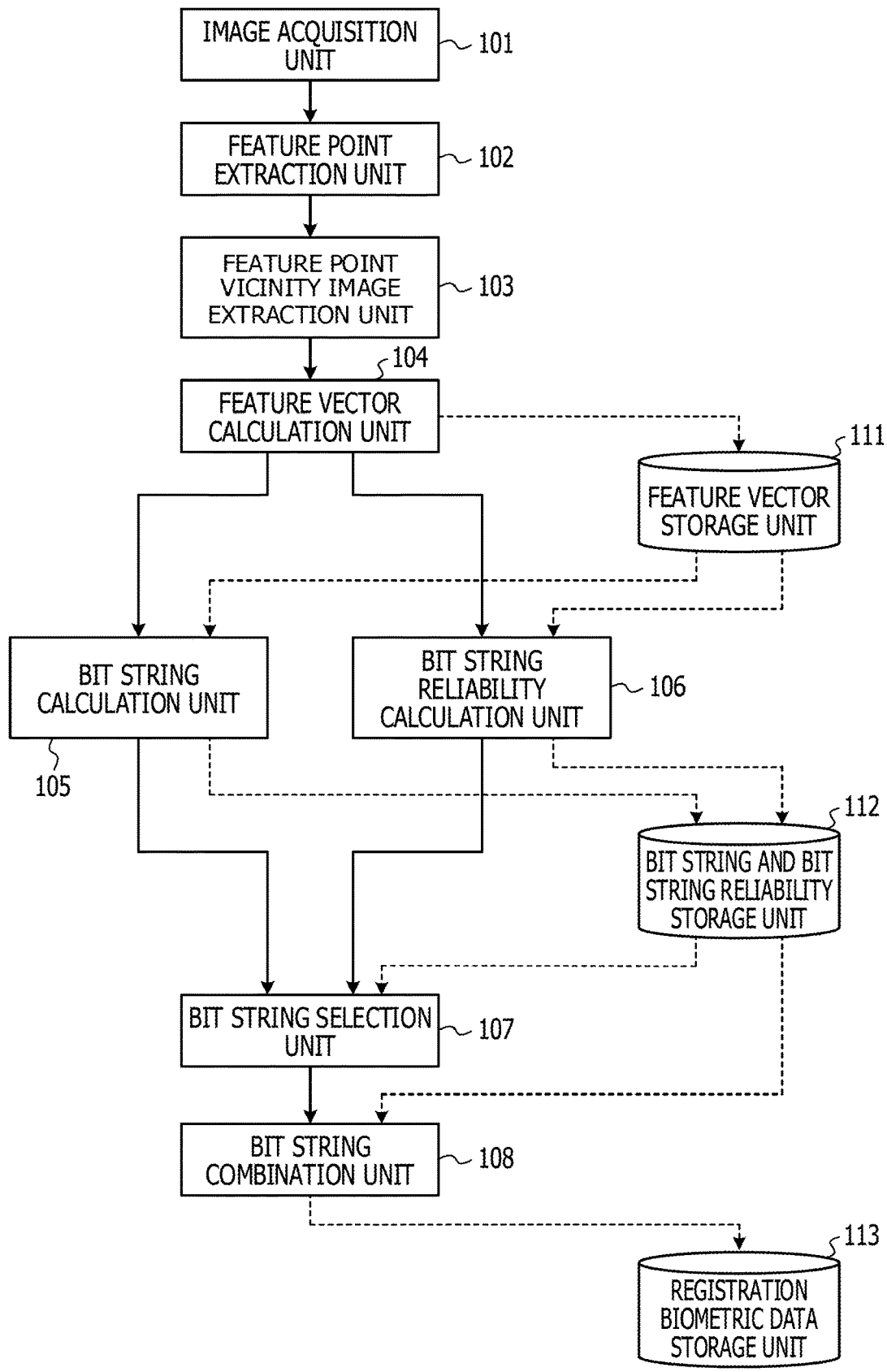
FIG. 1 is a diagram illustrating a configuration example of a biometric authentication apparatus in the present embodiment.

FIG. 1 is a block diagram illustrating a configuration example of a biometric authentication apparatus according to an embodiment of the present invention. FIG. 1 illustrates a biometric authentication apparatus that generates registration biometric data for authentication from a biometric image and registers the registration biometric data in advance. The biometric authentication apparatus illustrated in FIG. 1 includes an image acquisition unit 101, a feature point extraction unit 102, a feature point vicinity image extraction unit 103, a feature vector calculation unit 104, a bit string calculation unit 105, a bit string reliability calculation unit 106, a bit string selection unit 107, and a bit string combination unit 108. The biometric authentication apparatus further includes a feature vector storage unit 111, a bit string and bit string reliability storage unit 112, and a registration biometric data storage unit 113.

The image acquisition unit 101 acquires a biometric image of a user whose registration biometric data is to be registered. For example, the image acquisition unit 101 may acquire a biometric image of a user by capturing the biometric image by an image capturing unit, or may acquire a biometric image of a user by inputting a biometric image captured in advance. The biometric image is, for example, an image showing a part of a human body, such as a vein pattern, a fingerprint, or a face image.

The feature point extraction unit 102 is an example of an extraction unit, and extracts a plurality of feature points from the biometric image acquired by the image acquisition unit 101. Here, the feature points are points having characteristic image elements serving as references for collation in the biometric image. For example, when the biometric image shows a vein pattern, junctions (branch points), ends or the like of veins can be cited as examples of the feature points. For each of the plurality of feature points extracted by the feature point extraction unit 102, the feature point vicinity image extraction unit 103 extracts, from the biometric image, a partial image of a predetermined size in the vicinity of the feature point including the feature point.

The feature vector calculation unit 104 is an example of a vector calculation unit, and calculates, for each of the plurality of feature points, a feature vector from the partial image in the vicinity of the feature point extracted by the feature point vicinity image extraction unit 103. Here, the feature vector is assumed to be a multidimensional array, for example, a 64-dimensional array, a 128-dimensional array, or a 256-dimensional array. Any method can be used to calculate the feature vector from the image, and for example, it is possible to apply a method for performing polar coordinate conversion on the partial image in the vicinity of the feature point and calculating a frequency component of the partial image to calculate a frequency feature of the image, and obtaining an intensity for each frequency. The feature vector calculated by the feature vector calculation unit 104 is stored in the feature vector storage unit 111.

The bit string calculation unit 105 binarizes values of each of the dimensions of the feature vector for each feature vector calculated by the feature vector calculation unit 104, and calculates a bit string in which the values are arranged by the number of dimensions of the feature vector. The bit string calculation unit 105 reads out the feature vector from the feature vector storage unit 111, and binarizes the values of each of the dimensions of the feature vector by converting each of the values of the dimensions of the feature vector into "0" or "1" such that the value is "1" when the value is greater than a predetermined threshold or "0" when the value is less than or equal to the predetermined threshold. For example, when the feature vector is a 64-dimensional array, the bit string is 64 bits, and when the feature vector is a 256-dimensional array, the bit string is 256 bits. The bit string calculated by the bit string calculation unit 105 is stored in the bit string and bit string reliability storage unit 112.

The bit string reliability calculation unit 106 is an example of a reliability determination unit, and calculates and attaches, based on stability of the binarizing of the corresponding feature vector, bit string reliability for each bit string calculated by the bit string calculation unit 105. The bit string reliability indicates a degree to which the values of the binarized bit string do not change due to a minute change of the feature vector. The bit string reliability calculation unit 106 obtains the stability with which a bit is stably extracted in the calculation of the bit string in the bit string calculation unit 105, and calculates the bit string reliability based on the obtained stability. The bit string reliability calculated by the bit string reliability calculation unit 106 is stored in the bit string and bit string reliability storage unit 112 together with the corresponding bit string.

For example, the bit string reliability calculation unit 106 reads out the feature vector from the feature vector storage unit 111, and sets the stability to degrees that the values of the read feature vector are separated from a threshold for binarizing the values of the feature vector. In a case where a difference between the value of the feature vector and the threshold is small, a value of "0" or "1" obtained by binarization may be inverted with a slight change in the value of the feature vector. Therefore, the value is susceptible to noise or the like, and the stability is low. On the other hand, in a case where a difference between the value of the feature vector and the threshold is large, a value of "0" or "1" obtained by binarization does not change even when the value of the feature vector changes slightly. Therefore, the value is not easily affected by noise or the like, and the stability is high.

In this way, deviation degrees of the values of each of the dimensions of the feature vector from the threshold are regarded as degrees of stability of bits, and the bit string reliability calculation unit 106 obtains stability of binarization of the feature vector, and calculates the bit string reliability based on the degrees of stability of the bits in the entire bit string. For example, the bit string reliability calculation unit 106 sets, as the bit string reliability, a value obtained by accumulating the degree of stability of each of the bits (absolute values of the differences between the values of each of the dimensions of the feature vector and the threshold) in the entire bit string. In addition, the bit string reliability to be set is not limited to an accumulated value, and for example, the bit string reliability calculation unit 106 may set, as the bit string reliability, a median value or an average value of the degrees of stability of the bits of the entire bit string, or may set, as the bit string reliability, the number of bits in which the degrees of stability of the bits exceed a threshold of the degree of stability.

The bit string selection unit 107 is an example of a selection unit, and selects a predetermined number of bit strings from bit strings calculated by the bit string calculation unit 105 in accordance with values of bit string reliability calculated by the bit string reliability calculation unit 106. The bit string selection unit 107 reads out the bit strings and the bit string reliability thereof from the bit string and bit string reliability storage unit 112, compares magnitude of the values of the bit string reliability of the bit strings, and selects a predetermined number of bit strings in descending order of the bit string reliability.

The bit string combination unit 108 is an example of a combination unit, combines the bit strings selected by the bit string selection unit 107 to generate registration biometric data of a user, and registers the generated registration biometric data in the registration biometric data storage unit 113. Note that the bit string combination unit 108 combines only the bit strings, and does not combine the bit string reliability. For example, the registration biometric data to be registered in the registration biometric data storage unit 113 is data including only bit strings and no bit string reliability. The registration biometric data storage unit 113 is, for example, a database in which a plurality of pieces of registration biometric data is registered.

Figure 2:
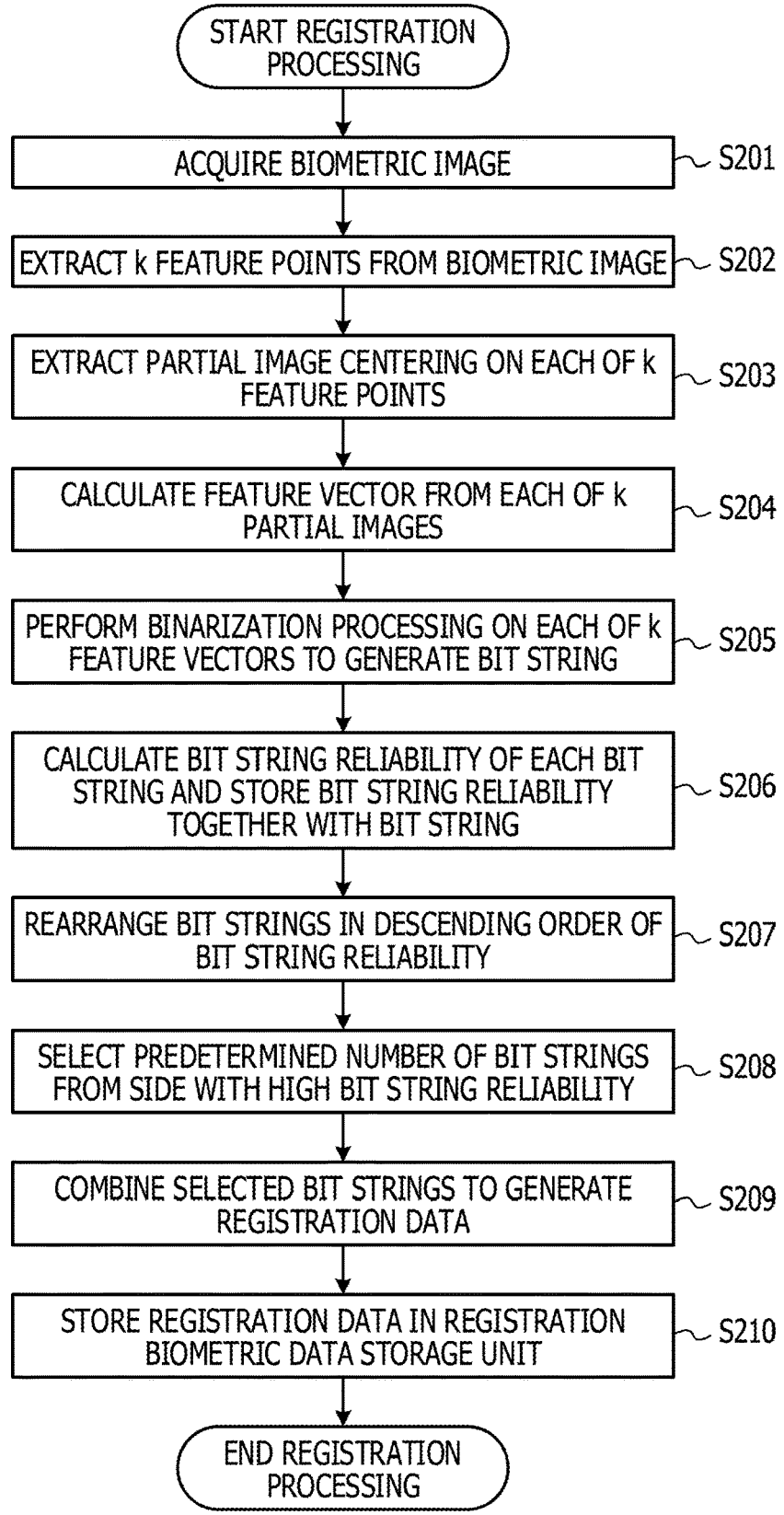
FIG. 2 is a flowchart illustrating an example of registration processing of the biometric authentication apparatus illustrated in FIG. 1.

Next, an operation of the biometric authentication apparatus illustrated in FIG. 1 will be described. FIG. 2 is a flowchart illustrating an example of registration processing of the biometric authentication apparatus illustrated in FIG. 1. Note that, in the registration processing described below, k feature points (k is an optional plural number) are extracted from one biometric image.

In the registration processing, first, in step S201, the image acquisition unit 101 acquires a biometric image for generating registration biometric data. In step S202, the feature point extraction unit 102 extracts k feature points having characteristic image elements useful for personal identification from the biometric image. Next, in step S203, the feature point vicinity image extraction unit 103 extracts, from the biometric image, a partial image of p pixels×p pixels centering on the feature point, for each of the k feature points. Note that p is a relatively small value, such as 15, 21 or 32. Subsequently, in step S204, the feature vector calculation unit 104 calculates one feature vector from each of the k partial images extracted in step S203.

Next, in step S205, the bit string calculation unit 105 performs binarization processing on each of k feature vectors calculated in step S204 to generate a bit string for each feature point, and stores the generated bit string in the bit string and bit string reliability storage unit 112. In step S206, the bit string reliability calculation unit 106 calculates bit string reliability of each bit string in the binarization processing on the k feature vectors calculated in step S204, and stores, in the bit string and bit string reliability storage unit 112, the calculated bit string reliability together with the corresponding bit string.

Figure 3:
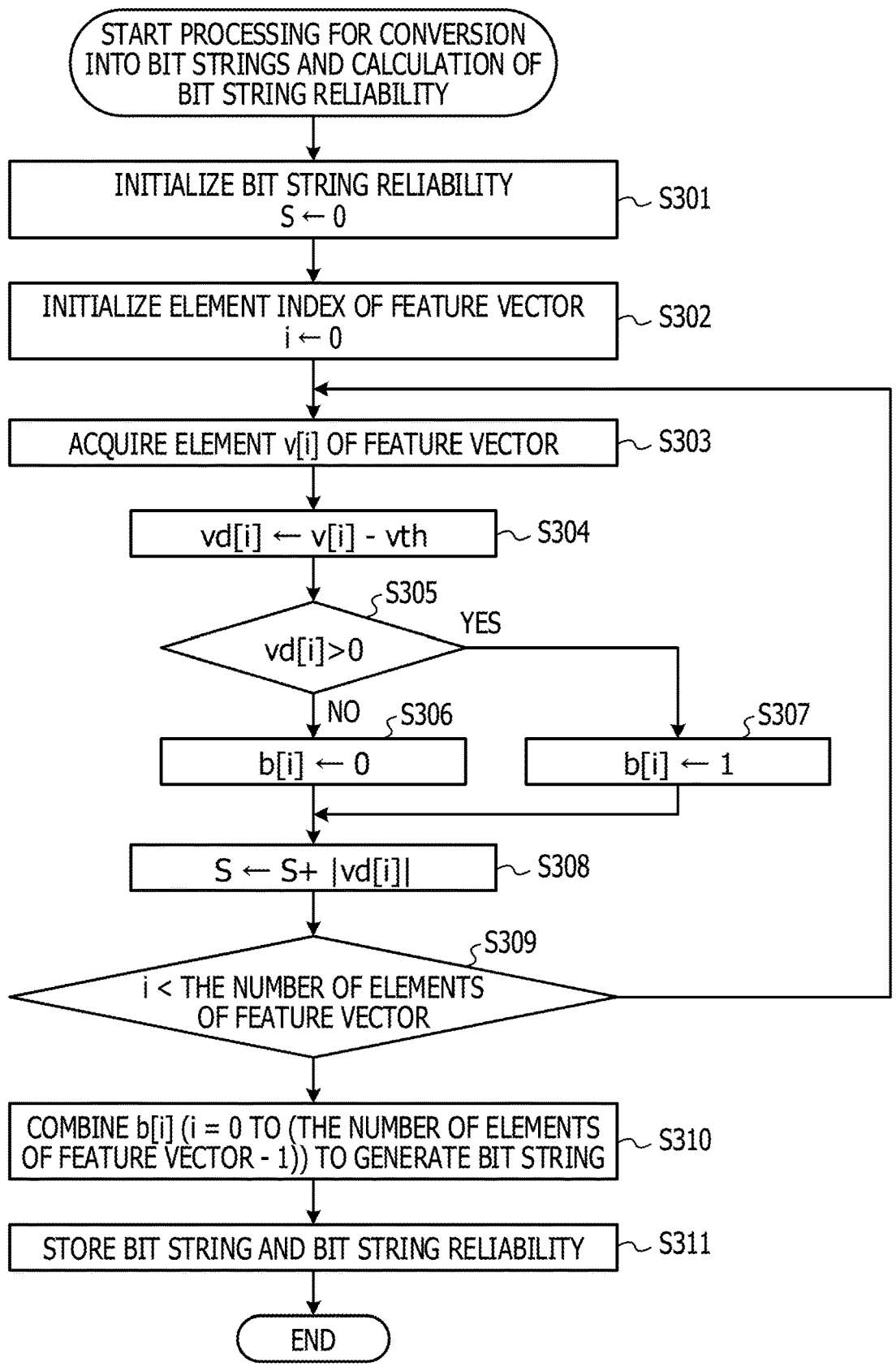
FIG. 3 is a flowchart illustrating an example of processing for conversion into bit strings and calculation of bit string reliability.

The processing for conversion into bit strings and calculation of bit string reliability executed in steps S205 and S206 described above will be described with reference to FIG. 3. FIG. 3 is a flowchart illustrating an example of processing for conversion into bit strings and calculation of bit string reliability, and the processing is executed for each feature vector by the bit string calculation unit 105 and the bit string reliability calculation unit 106.

First, in step S301, a value of bit string reliability S of a bit string to be generated is initialized to 0, and in step S302, a value of an element index i of a feature vector is initialized to 0. In step S303, a value of the ith element v[i] of the feature vector is acquired, and in step S304, a value obtained by subtracting a threshold with for performing binarization from the value of the ith element v[i] is calculated as a deviation degree vd[i] for the ith element.

Next, in step S305, it is determined whether or not the deviation degree vd[i] for the ith element is greater than 0, and when the deviation degree vd[i] is not greater than 0, a value of the ith element b[i] of a bit string to be generated is set to "0" (S306), and when the deviation degree vd[i] is greater than 0, a value of the ith element b[i] of a bit string to be generated is set to "1" (S307). In addition, in step S308, an absolute value of the deviation degree vd[i] for the ith element is added to the bit string reliability S, and the bit string reliability S is updated.

Next, in step S309, it is determined whether or not the value of the element index i is smaller than the number of elements of the feature vector. In a case where the value is smaller than the number of elements of the feature vector, the value of the element index i is increased by 1, and the processing returns to step S303. On the other hand, in a case where the value of the element index i is not smaller than the number of elements of the feature vector, in step S310, elements b[i] from the 0th element to the (the number of elements of the feature vector−1)th element obtained until then are combined to generate a bit string. Then, in step S311, a pair of the bit string and the bit string reliability S is stored in the bit string and bit string reliability storage unit 112, and the processing ends.

Note that, in a series of processing illustrated in FIG. 3, the processing of step S301 and the processing of step S302 are in no particular order, and the processing of step S301 may be performed after the processing of step S302, or the processing of step S301 and the processing of S302 may be performed in parallel. In addition, processing in which steps S305, S306, and S307 are combined and the processing of step S308 are in no particular order, and the processing of step S305 may be performed after the processing of step S308, or the processing in which steps S305, S306, and S307 are combined and the processing of step S308 may be performed in parallel.

Returning to FIG. 2, after the bit string and the bit string reliability are calculated for each of the k feature vectors in steps S205 and S206 as described above, in step S207, the bit string selection unit 107 rearranges the bit strings in descending order of the bit string reliability. Next, in step S208, the bit string selection unit 107 selects a predetermined number of bit strings from the rearranged bit strings from a side with high bit string reliability so as to be within the predetermined upper limit size of registration biometric data.

Subsequently, in step S210, the bit string combination unit 108 combines the bit strings selected in step S208 to generate registration biometric data. Note that, at this time, the bit string combination unit 108 combines only the bit strings, and does not combine the bit string reliability. Next, in step S210, the bit string combination unit 108 stores the registration biometric data (a combined bit string) generated in step S209 in the registration biometric data storage unit 113, and the registration processing ends.

Figure 4:
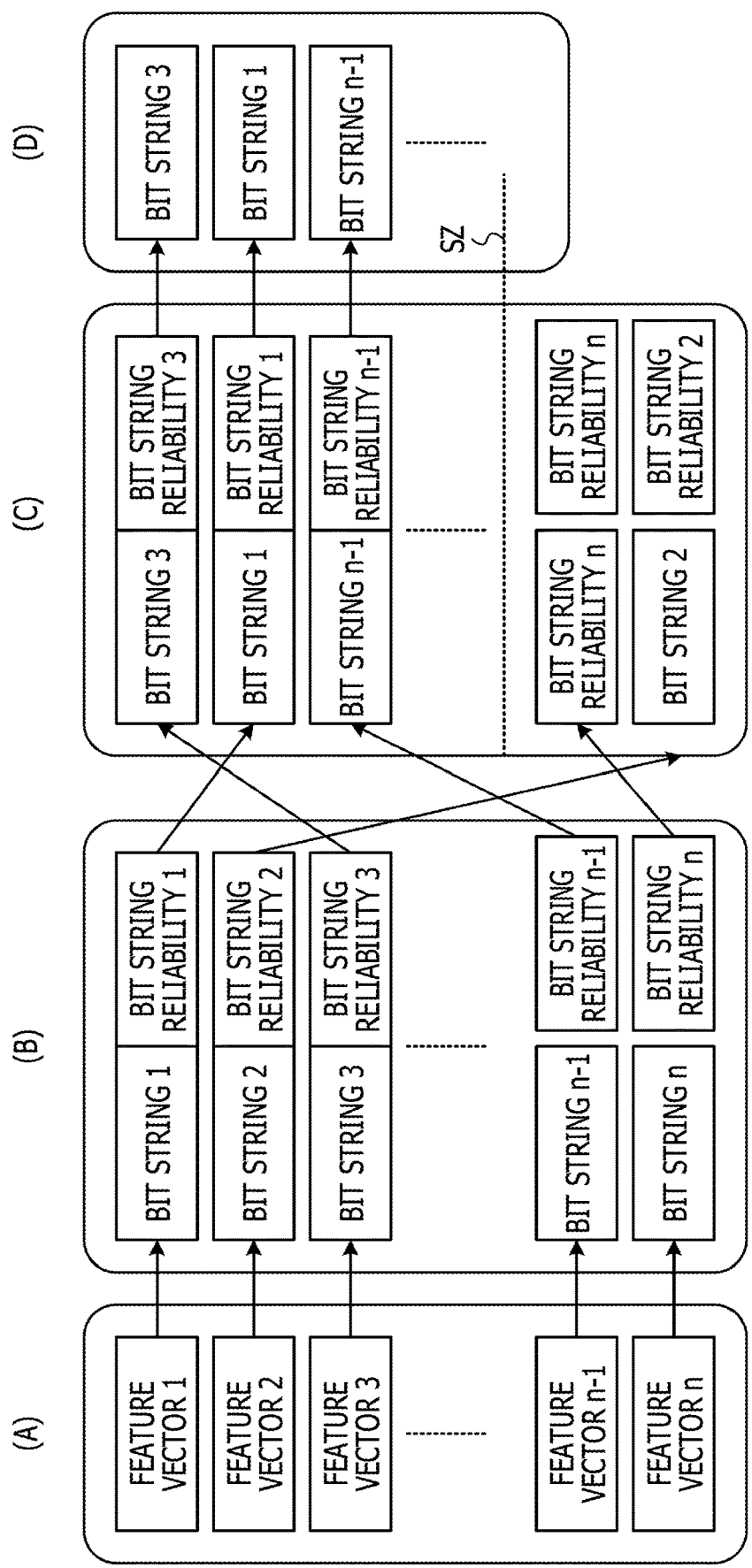
FIG. 4 is diagrams for describing generation of registration biometric data in the present embodiment.

As described above, the biometric authentication apparatus illustrated in FIG. 1 performs binarization processing on a feature vector (n feature vectors in this example) of each of feature points, which are biometric data before conversion into bit strings illustrated in FIG. 4(A), to calculate bit strings. In addition, when converting feature vectors into bit strings, the biometric authentication apparatus calculates bit string reliability of each of the bit strings, and stores the bit string reliability together with the bit strings which are biometric data converted into bit strings, as illustrated in FIG. 4(B). Then, the biometric authentication apparatus rearranges the bit strings in descending order of the bit string reliability based on the bit string reliability, as illustrated in FIG. 4(C), and selects bit strings from a side with high bit string reliability so as not to exceed a predetermined upper limit size SZ of registration biometric data, as illustrated in FIG. 4(D), and combines the selected bit strings to generate registration biometric data.

In this way, the biometric authentication apparatus illustrated in FIG. 1 can reduce an amount of data by selecting and combining bit strings in accordance with values of bit string reliability of bit strings calculated when conversion into bit strings is performed and generating registration biometric data for authentication. In addition, the biometric authentication apparatus can suppress deterioration in authentication accuracy by preferentially selecting bit strings having high reliability from a plurality of bit strings to generate registration biometric data.

In addition, since registration biometric data for authentication is expressed by a binary ("0" or "1") bit string, in collation processing to be described later, collation can be performed in comparison processing of bit strings, and the collation processing can be performed in a short time. For example, even in a case where comparison and collation with a large number of pieces of registration biometric data are performed in 1:N authentication for authenticating who the person is, the collation processing can be performed in a short time.

Figure 5A:
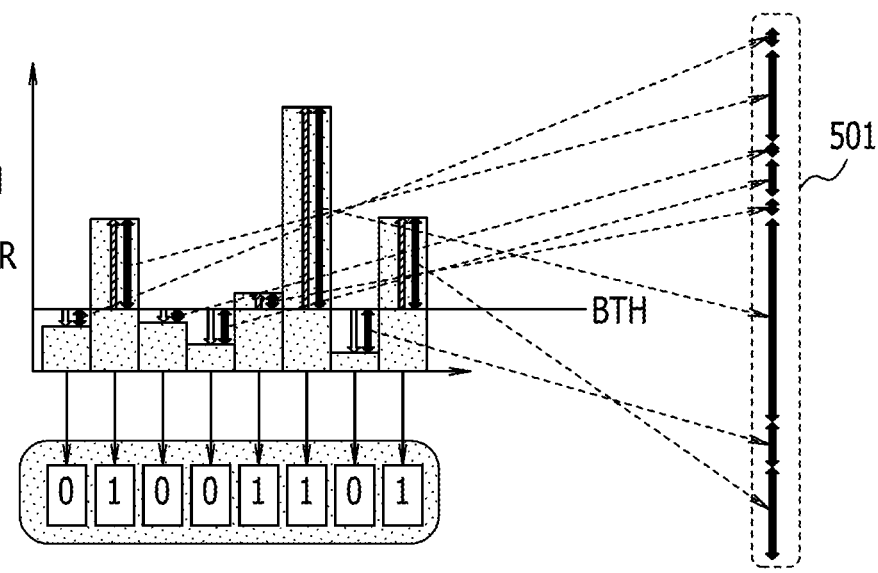
FIGS. 5A to 5C are diagrams for describing examples of the bit string reliability in the present embodiment.

In the above description, an example is shown in which a value obtained by accumulating a deviation degree of a value of each of dimensions of a feature vector from a threshold (absolute values of differences between a value of each of dimensions of a feature vector and a threshold) in the entire bit string is set as bit string reliability. For example, as illustrated in FIG. 5A, in a case where a threshold for binarizing a value of each of dimensions of a feature vector is BTH, a value 501 obtained by accumulating absolute values of differences between the value of each of the dimensions of the feature vector and the threshold BTH by the number of dimensions of the feature vector is set as bit string reliability. In this way, in a case where a value obtained by accumulating deviation degrees of a value of each of dimensions of a feature vector from a threshold is used as bit string reliability, the bit string reliability can be calculated by a simple arithmetic operation. In FIG. 5A, a case where a feature vector is an eight-dimensional array is exemplified for convenience of explanation. However, in practice, the feature vector has the greater number of dimensions such as a 64-dimensional array, a 128-dimensional array, or a 256-dimensional array (the same applies to FIGS. 5B and 5C).

Note that information used as bit string reliability is not limited to this. For example, an average value of deviation degrees of a value of each of dimensions of a feature vector from a threshold (absolute values of differences between a value of each of dimensions of a feature vector and a threshold) in the entire bit string may be set as bit string reliability. In a case where an average value of deviation degrees of a value of each of dimensions of a feature vector from a threshold in the entire bit string is used as bit string reliability, a value of the bit string reliability is smaller than an accumulated value, and capacity required for storing bit string reliability can be reduced.

Figure 5B:
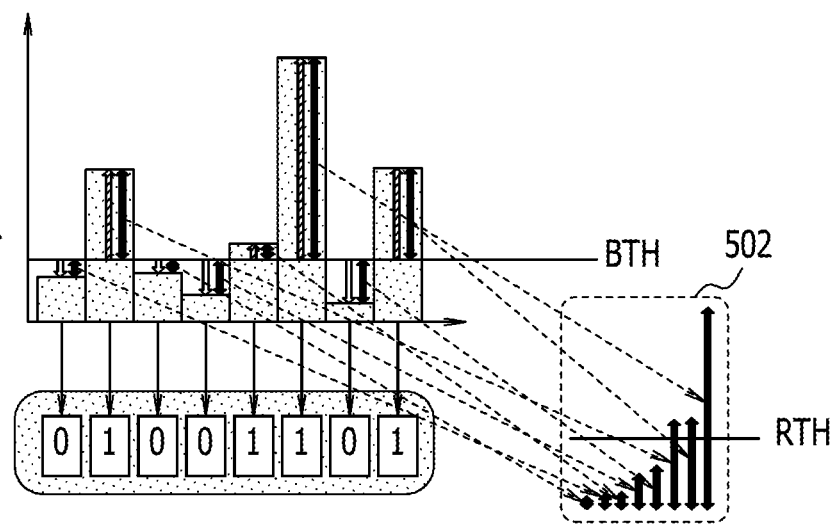

In addition, for example, as exemplified in FIG. 5B, the number of dimensions (the number of bits) in which deviation degrees of a value of each of dimensions of a feature vector from a threshold (absolute values of differences between a value of each of dimensions of a feature vector and a threshold) becomes greater than a threshold of a degree of stability may be set as bit string reliability. For example, in a case where a threshold for binarizing a value of each of dimensions of a feature vector is BTH, as denoted by 502, the number of dimensions (the number of bits) in which absolute values of differences between the value of each of the dimensions of the feature vector and the threshold BTH exceed a threshold RTH of a degree of stability is set as bit string reliability. In the example illustrated in FIG. 5B, in three bits, absolute values of differences between a value of each of dimensions of a feature vector and the threshold BTH exceed the threshold RTH of a degree of stability. Accordingly, a value of bit string reliability is set to 3. In a case where the number of dimensions (the number of bits) in which deviation degrees of a value of each of dimensions of a feature vector from a threshold become greater than a threshold of a degree of stability is used as bit string reliability, even when there is a bit having a significantly greater deviation degree compared with other bits, an influence of the deviation degree of the bit on the bit string reliability can be reduced.

Figure 5C:
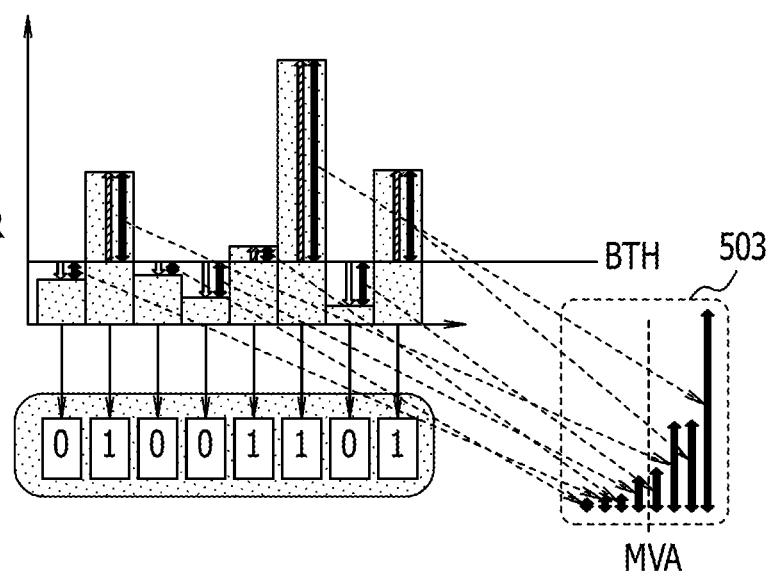

In addition, for example, as exemplified in FIG. 5C, a median value when deviation degrees of a value of each of dimensions of a feature vector from a threshold (absolute values of differences between a value of each of dimensions of a feature vector and a threshold) are arranged in ascending order of values of the deviation degrees may be set as bit string reliability. For example, in a case where a threshold for binarizing a value of each of dimensions of a feature vector is BTH, as denoted by 503, a value of a median MVA when absolute values of differences between the value of each of the dimensions of the feature vector and the threshold BTH are arranged in ascending order of the absolute values is set as bit string reliability. Note that, in a case where the total number of bits in a bit string is an even number, an average value of two values which are previous and subsequent values adjacent to the median MVA may be set as bit string reliability, or either value may be set as bit string reliability. Also in a case where a median value when deviation degrees of a value of each of dimensions of a feature vector from a threshold are arranged in ascending order of values of the deviation degrees may be used as bit string reliability, an influence of a bit having a significantly greater deviation degree compared with other bits on the bit string reliability can be reduced.

Figure 6:
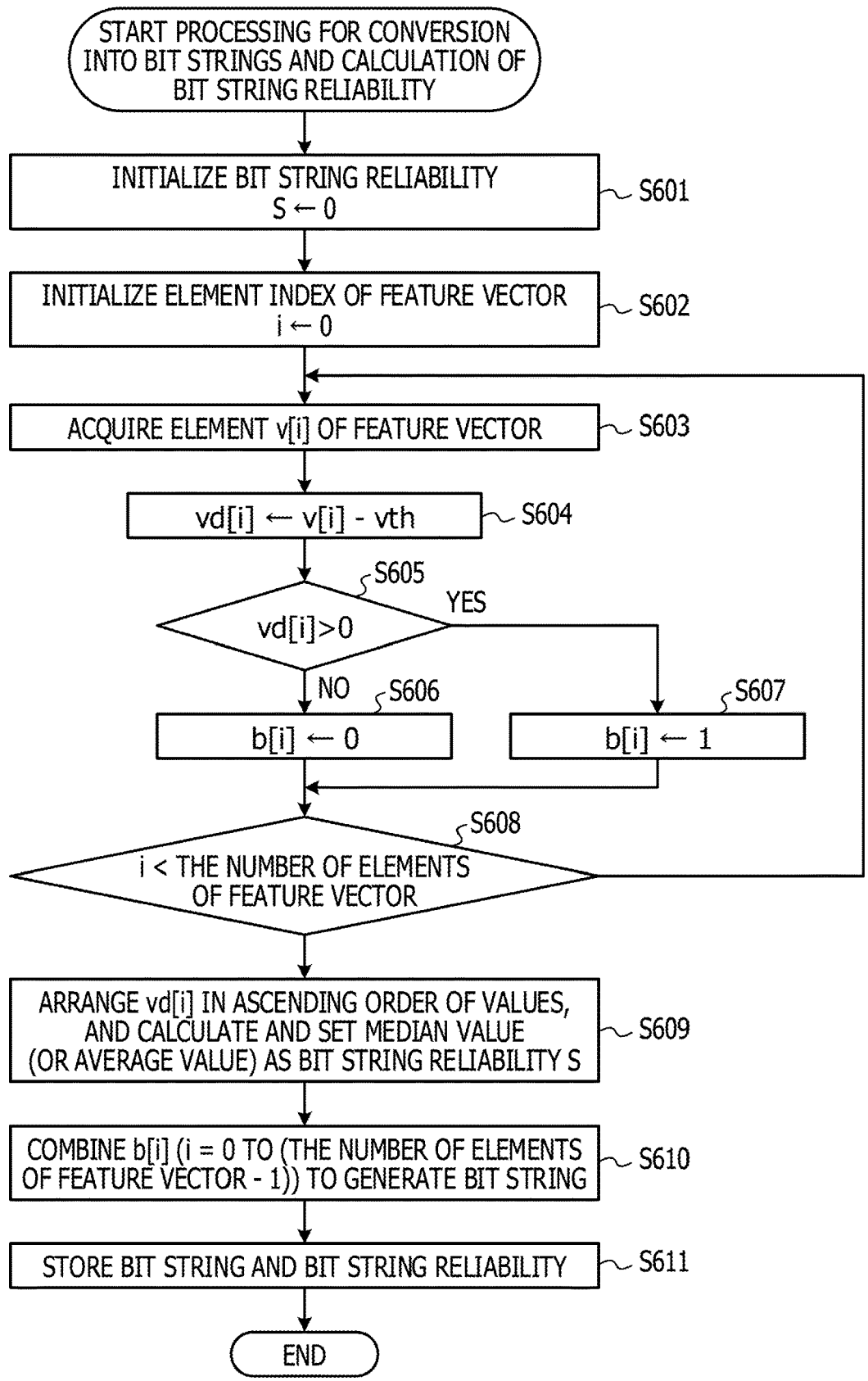
FIG. 6 is a flowchart illustrating another example of the processing for conversion into bit strings and calculation of the bit string reliability.

With reference to FIG. 6, a description will be made on the processing for conversion into bit strings and calculation of bit string reliability executed in steps S205 and S206 described above in a case where a median value when deviation degrees of a value of each of dimensions of a feature vector from a threshold are arranged in ascending order of values of the deviation degrees may be used as bit string reliability. FIG. 6 is a flowchart illustrating another example of the processing for conversion into bit strings and calculation of bit string reliability, and the processing is executed for each feature vector by the bit string calculation unit 105 and the bit string reliability calculation unit 106.

First, in step S601, a value of bit string reliability S of a bit string to be generated is initialized to 0, and in step S602, a value of an element index i of a feature vector is initialized to 0. Note that the processing of step S601 and the processing of step S602 are in no particular order, and the processing of step S601 may be performed after the processing of step S602, or the processing of step S601 and the processing of S602 may be performed in parallel.

In step S603, a value of the ith element v[i] of the feature vector is acquired, and in step S604, a value obtained by subtracting a threshold with for performing binarization from the value of the ith element v[i] is calculated as a deviation degree vd[i] of the ith element. Next, in step S605, it is determined whether or not the deviation degree vd[i] of the ith element is greater than 0, and when the deviation degree vd[i] is not greater than 0, a value of the ith element b[i] of a bit string to be generated is set to "0" (S606), and when the deviation degree vd[i] is greater than 0, a value of the ith element b[i] of a bit string to be generated is set to "1" (S607).

Next, in step S608, it is determined whether or not the value of the element index i is smaller than the number of elements of the feature vector. In a case where the value is smaller than the number of elements of the feature vector, the value of the element index i is increased by 1, and the processing returns to step S603. On the other hand, in a case where the value of the element index i is not smaller than the number of elements of the feature vector, in step S609, deviation degrees vd[i] of elements are arranged in ascending order of values of deviation degrees, and a median value (or an average value of two values as medians) thereof is calculated and set as bit string reliability S. Next, in step S610, elements b[i] from the 0th element to the (the number of elements of the feature vector−1)th element obtained until then are combined to generate a bit string. Then, in step S611, a pair of the bit string and the bit string reliability S is stored in the bit string and bit string reliability storage unit 112, and the processing ends.

Figure 7:
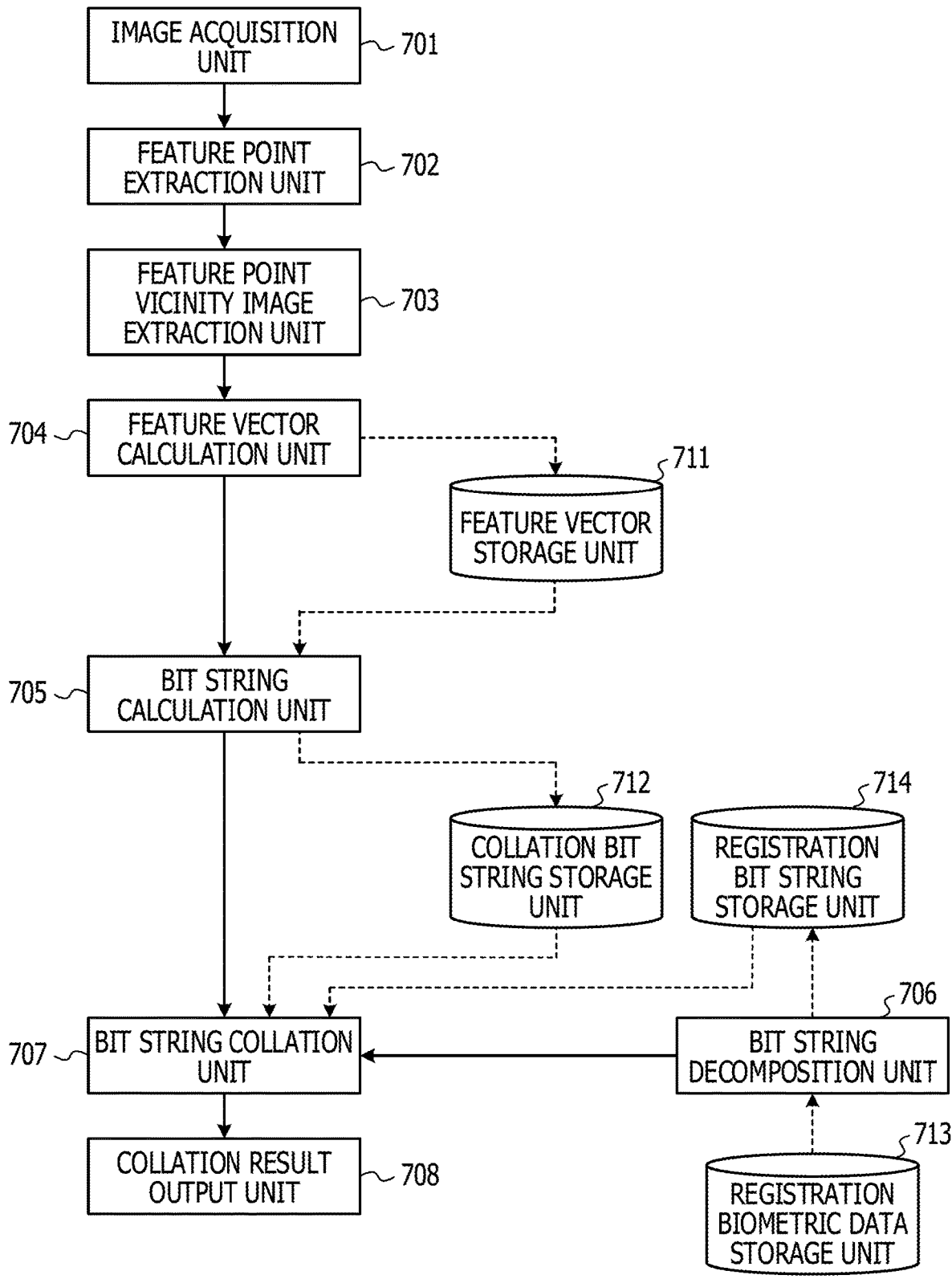
FIG. 7 is a diagram illustrating a configuration example of the biometric authentication apparatus in the present embodiment.

FIG. 7 is a block diagram illustrating a configuration example of the biometric authentication apparatus in the present embodiment. FIG. 7 illustrates a biometric authentication apparatus that performs collation related to authentication using registered registration biometric data. The biometric authentication apparatus illustrated in FIG. 7 includes an image acquisition unit 701, a feature point extraction unit 702, a feature point vicinity image extraction unit 703, a feature vector calculation unit 704, a bit string calculation unit 705, a bit string decomposition unit 706, a bit string collation unit 707, and a collation result output unit 708. The biometric authentication apparatus further includes a feature vector storage unit 711, a collation bit string storage unit 712, a registration biometric data storage unit 713, and registration bit string storage unit 714.

The image acquisition unit 701 acquires a biometric image to be collated (a biometric image for collation) captured by an image capturing unit or the like. The feature point extraction unit 702 extracts a plurality of feature points from the biometric image for collation acquired by the image acquisition unit 701. For each of the plurality of feature points extracted by the feature point extraction unit 702, the feature point vicinity image extraction unit 703 extracts, from the biometric image for collation, a partial image of a predetermined size in the vicinity of the feature point including the feature point.

Using a calculation method similar to that by the feature vector calculation unit 104 illustrated in FIG. 1, the feature vector calculation unit 704 calculates, for each of the plurality of feature points, a feature vector from the partial image in the vicinity of the feature point extracted by the feature point vicinity image extraction unit 703. The feature vector calculated by the feature vector calculation unit 704 is stored in the feature vector storage unit 711.

Similarly to the bit string calculation unit 105 illustrated in FIG. 1, the bit string calculation unit 705 binarizes a value of each of the dimensions of the feature vector for each feature vector calculated by the feature vector calculation unit 704, and calculates a bit string in which the values are arranged by the number of dimensions of the feature vector. The bit string calculation unit 705 reads out the feature vector from the feature vector storage unit 711, and binarizes the value of each of the dimensions of the feature vector by comparing the value with a predetermined threshold, and converting the value into "0" or "1". The bit string calculated by the bit string calculation unit 705 is stored in the collation bit string storage unit 712.

The registration biometric data storage unit 113 is, for example, a database in which a plurality of pieces of registration biometric data is registered. The registration biometric data storage unit 713 stores the registration biometric data (combined bit string) generated by the biometric authentication apparatus illustrated in FIG. 1 and registered in the registration biometric data storage unit 713. The bit string decomposition unit 706 reads out the registration biometric data from the registration biometric data storage unit 713 and decomposes the registration biometric data into bit strings in units of feature points. The bit strings obtained by decomposition by the bit string decomposition unit 706 is stored in the registration bit string storage unit 714.

The bit string collation unit 707 collates bit strings (collation bit strings) calculated from the biometric image for collation with the bit strings (registration bit strings) obtained by decomposition of the registration biometric data. The bit string collation unit 707 reads out the collation bit strings from the collation bit string storage unit 712 and the registration bit strings from the registration bit string storage unit 714 to obtain a matching degree between the read collation bit strings and the read registration bit strings, and determines whether a user is the person himself/herself based on the calculated matching degree. The collation result output unit 708 outputs a result of collation by the bit string collation unit 707.

In the present embodiment, the numbers of feature points for the collation bit strings and the registration bit strings do not necessarily match. Thus, the bit string collation unit 707 performs comprehensive collation between the collation bit strings and the registration bit strings to obtain matching degrees of bits, and performs identity verification based on the matching degrees of the bits. For example, the bit string collation unit 707 determines that a user is the person himself/herself when the matching degrees of the bits are higher than a predetermined threshold. Note that collation of the person himself/herself by comparison of the bit strings is not limited to the above-described method, and various methods can be applied. For example, the bit string collation unit 707 may determine that a user is the person himself/herself when the number of bit strings having high matching degrees of bits is greater than a predetermined threshold, or may determine that a user is the person himself/herself when the number of bits in which values match are summed and the number of the bits in which the values match is greater than a predetermined threshold.

Figure 8:
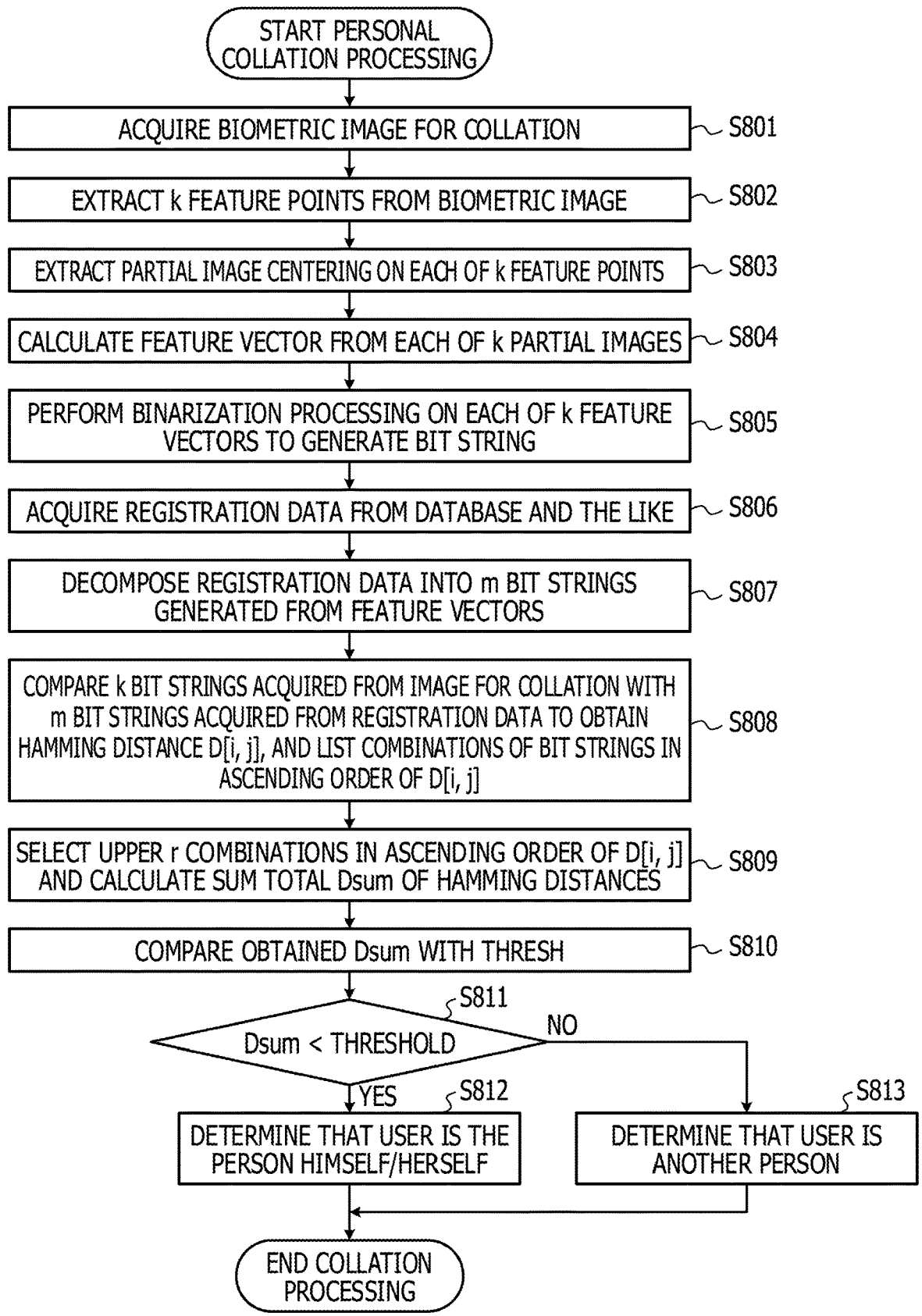
FIG. 8 is a flowchart illustrating an example of collation processing of the biometric authentication apparatus illustrated in FIG. 7.

Next, an operation of the biometric authentication apparatus illustrated in FIG. 7 will be described. FIG. 8 is a flowchart illustrating an example of collation processing of the biometric authentication apparatus illustrated in FIG. 7. Note that, in collation processing described below, it is assumed that k feature points are extracted from one biometric image for collation, and registration biometric data is data in which bit strings related to m feature points are combined (k and m are optional plural numbers).

In the collation processing, first, in step S801, the image acquisition unit 701 acquires a biometric image to be collated (a biometric image for collation). In step S802, the feature point extraction unit 702 extracts k feature points having characteristic image elements useful for personal identification from the biometric image for collation. Next, in step S803, the feature point vicinity image extraction unit 703 extracts, from the biometric image for collation, a partial image of p pixels×p pixels centering on the feature point, for each of the k feature points.

Subsequently, in step S804, the feature vector calculation unit 704 calculates one feature vector from each of the k partial images extracted in step S803. Next, in step S805, the bit string calculation unit 705 performs binarization processing on each of the k feature vectors calculated in step S804 to generate a bit string (collation bit string) for each feature point of the biometric image for collation.

In step S806, the bit string decomposition unit 706 acquires registration biometric data from the registration biometric data storage unit 713. Next, in step S807, the bit string decomposition unit 706 decomposes the registration biometric data acquired in step S806 into bit strings for feature points, for example, m bit strings generated from feature vectors (registration bit strings). Note that the processing of step S806 and the processing of step S807 are not necessarily executed after step S805, and may be performed any time before the processing of the next step S808.

In step S808, the bit string collation unit 707 comprehensively compares k bit strings (collation bit strings) acquired from the biometric image for collation with m bit strings (registration bit strings) acquired from the registration biometric data, to obtain a hamming distance $D[i, j]$ between the ith collation bit string (i=1 to k) and the jth registration bit string (j=1 to m). Then, combinations of the collation bit string and the registration bit string are listed in ascending order of the hamming distance $D[i, j]$. Note that the hamming distance is obtained by comparing two bit strings and counting the number of differences between values, and the greater the difference, the greater the hamming distance, and the smaller the difference, the smaller the hamming distance.

Next, in step S809, the bit string collation unit 707 selects upper (from a side with a small hamming distance $D[i, j]$) r combinations from the combinations of the collation bit string and the registration bit string listed in ascending order of the hamming distance $D[i, j]$. Then, a sum total Dsum of the hamming distances $D[i, j]$ in the selected r combinations of the collation bit string and the registration bit string is calculated.

Next, in step S810, the bit string collation unit 707 compares the sum total Dsum calculated in step S809 with a predetermined threshold. As a result of the comparison, when the sum total Dsum is smaller than the threshold (YES in S811), the bit string collation unit 707 determines that a user is the person himself/herself (S812), and when the sum total Dsum is not smaller than the threshold (NO in S811), the bit string collation unit 707 determines that a user is another person (S813), and the collation processing ends.

In the above description, a sum total of hamming distances of bit strings is obtained to set the sum total as similarity between collation bit strings and registration bit strings. However, a method for obtaining similarity between collation bit strings and registration bit strings is not limited to a method for determining a hamming distance, and any method for obtaining similarity between bit strings can be applied.

Note that the biometric authentication apparatus illustrated in FIG. 7 may be one apparatus integrated with the biometric authentication apparatus illustrated in FIG. 1 or may be an apparatus different from the biometric authentication apparatus illustrated in FIG. 1, as long as the registration biometric data generated by the biometric authentication apparatus illustrated in FIG. 1 is registered in the registration biometric data storage unit 713. In a case where the biometric authentication apparatus illustrated in FIG. 7 is one device integrated with the biometric authentication apparatus illustrated in FIG. 1, functional units that achieve the same function in these biometric authentication apparatuses may be shared by one functional unit. In addition, the registration biometric data storage unit 113 and the registration biometric data storage unit 713 may be constituted by a storage unit such as one external database.

The biometric authentication apparatus according to the above-described embodiment can be achieved, for example, by a computer executing a program. In addition, a computer readable recording medium recording such a program can also be applied as an embodiment of the present invention. As the recording medium, for example, a flexible disk, a hard disk, an optical disk, a magneto-optical disk, a CD-ROM, a magnetic tape, a non-volatile memory card, a ROM or the like can be used.

In addition, a program product in which a function of the above-described embodiment is achieved by a computer executing a program and performing processing can be applied as an embodiment of the present invention. Examples of the program product include a program itself that achieves a function of the above-described embodiment, and a computer into which a program is read. In addition, as the program product, there are a transmission apparatus capable of providing a program to a computer communicably coupled via a network, a network system including the transmission apparatus, and the like.

In addition, also in a case where a function of the above-described embodiment is achieved by a supplied program, an operating system (OS) or another application operating on a computer and the like, such a program can be applied as an embodiment of the present invention. In addition, also in a case where all or part of processing of a supplied program is performed by a function expansion unit of a computer to achieve a function of the above-described embodiment, such a program can be applied as an embodiment of the present invention. In addition, in order to use the present embodiment in a network environment, all or part of the program may be executed by another computer.

Figure 9:
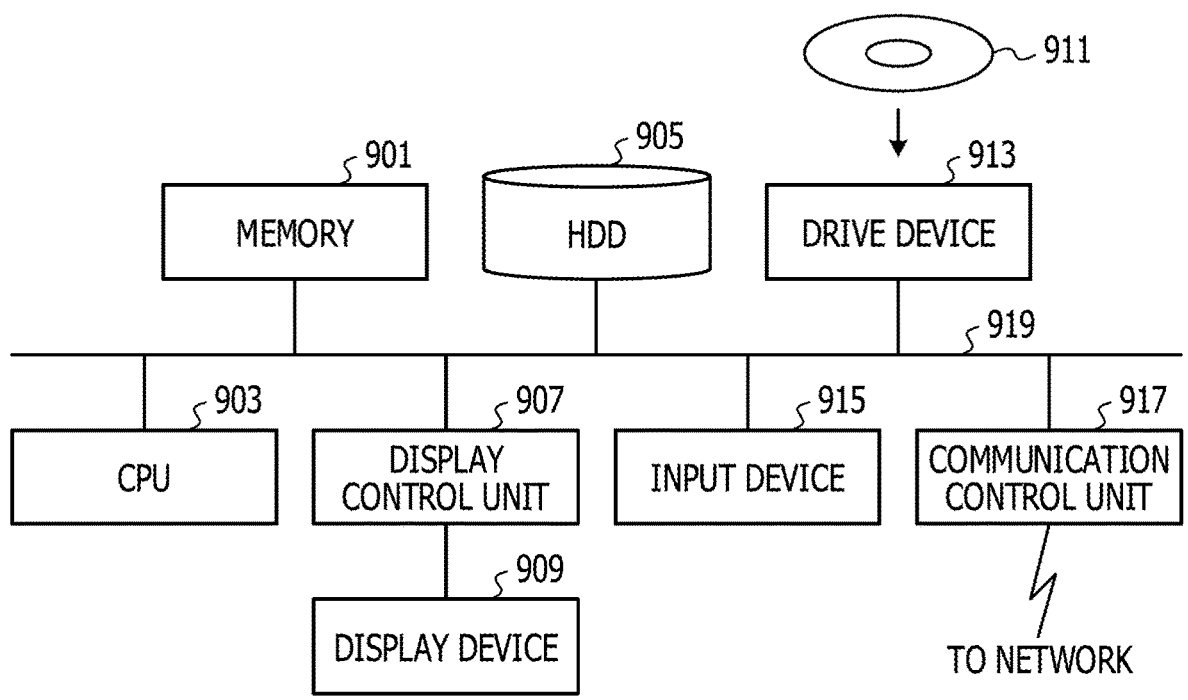
FIG. 9 is a functional block diagram of a computer capable of achieving the biometric authentication apparatus in the present embodiment.

For example, the biometric authentication apparatus according to the above-described embodiment can be achieved by a computer as illustrated in FIG. 9. In the computer illustrated in FIG. 9, a memory 901, a central processing unit (CPU) 903, a hard disk drive (HDD) 905, a display control unit 907 coupled to a display device 909, a drive device 913 for a removable disk 911, an input device 915, and a communication control unit 917 for coupling to a network are coupled by a bus 919. An operating system (OS) and an application program for carrying out processing in the present embodiment are stored in the HDD 905, and read out from the HDD 905 to the memory 901 when executed by the CPU 903. The CPU 903 controls the display control unit 907, the communication control unit 917, and the drive device 913 according to a processing content of the application program and causes these members to perform a predetermined operation. In addition, data in the middle of processing is mainly stored in the memory 901, but may be stored in the HDD 905. In this example, the application program for carrying out the above-described processing is stored in the removable disk 911 serving as a computer readable recording medium to be distributed and installed in the HDD 905 from the drive device 913. There is also a case where the application program is installed in the HDD 905 by way of a network such as the Internet and the communication control unit 917. Such a computer achieves various functions of the above-described embodiment by organic cooperation between hardware such as the CPU 903 and the memory 901 as described above and software such as the OS and the application program.

Note that any of the above embodiments are merely examples of implementations of the present invention and should not be construed as limiting the scope of the present invention. That is, the present invention can be implemented in various forms without departing from the technical idea or main features thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
  extract a plurality of feature points from a biometric image;
  calculate, for each of the feature points, respective feature vectors including the respective feature points from the biometric image;
  calculate bit strings by binarizing by subtracting a first threshold from each of values of each of dimensions for each of the calculated feature vectors, setting one to the value of the corresponding dimension when a subtraction result is greater than zero and setting zero to the corresponding value of the corresponding dimension when the subtraction result is not greater than zero and generating the bit strings by arranging set values of the vectors for each of the calculated feature vectors;
  attach, to each of the calculated bit strings, reliability which is generated by accumulating the subtraction results of the values of dimensions, acquiring a number of dimensions in which the subtraction results of the values of dimensions exceed a second threshold, calculating a median value or an average value of the subtraction results of the values of dimensions; and
  select a specific number of the bit strings from the calculated bit strings in accordance with values of the reliability in descending order of the values of the reliability and so as not to exceed a specific size,
  wherein the processor is configured to combine the specific number of the selected bit strings and generate registration data.

2. A biometric authentication method comprising:
extracting, by a computer, a plurality of feature points from a biometric image;
calculating, for each of the feature points, respective feature vectors including the respective feature points from the biometric image;
calculating bit strings by binarizing by subtracting a first threshold from each of values of each of dimensions for each of the calculated feature vectors, setting one to the value of the corresponding dimension when a subtraction result is greater than zero and setting zero to the corresponding value of the corresponding dimension when the subtraction result is not greater than zero and generating the bit strings by arranging set values of the vectors for each of the calculated feature vectors;
attaching, to each of the calculated bit strings, reliability which is generated by accumulating the subtraction results of the values of dimensions, acquiring a number of dimensions in which the subtraction results of the values of dimensions exceed a second threshold, calculating a median value or an average value of the subtraction results of the values of dimensions; and
selecting a specific number of the bit strings from the calculated bit strings in accordance with values of the reliability in descending order of the values of the reliability and so as not to exceed a specific size,
wherein the specific number of the selected bit strings are combined to generate registration data.

3. A non-transitory computer readable recording medium recording a biometric authentication program for causing a computer to execute processing comprising:
extracting a plurality of feature points from a biometric image;
calculating, for each of the feature points, respective feature vectors including the respective feature points from the biometric image;
calculating bit strings by binarizing by subtracting a first threshold from each of values of each of dimensions for each of the calculated feature vectors, setting one to the value of the corresponding dimension when a subtraction result is greater than zero and setting zero to the corresponding value of the corresponding dimension when the subtraction result is not greater than zero and generating the bit strings by arranging set values of the vectors for each of the calculated feature vectors;
attaching, to each of the calculated bit strings, reliability which is generated by accumulating the subtraction results of the values of dimensions, acquiring a number of dimensions in which the subtraction results of the values of dimensions exceed a second threshold, calculating a median value or an average value of the subtraction results of the values of dimensions; and
selecting a specific predetermined number of the bit strings from the calculated bit strings in accordance with values of the reliability in descending order of the values of the reliability and so as not to exceed a specific size,
wherein the specific number of the selected bit strings are combined to generate registration data.

* * * * *